United States Patent [19]

Duling et al.

[11] 3,865,674

[45] Feb. 11, 1975

[54] POROUS POLYETHYLENE SHEET

[75] Inventors: Irl N. Duling, West Chester; John C. Merges, Jr., Glen Mills, both of Pa.

[73] Assignee: Sun Research and Development Co., Marcus Hook, Pa.

[22] Filed: Oct. 16, 1972

[21] Appl. No.: 298,035

Related U.S. Application Data

[60] Continuation-in-part of Ser. No. 157,771, June 28, 1971, abandoned, which is a division of Ser. No. 885,355, Dec. 15, 1969, abandoned, which is a continuation-in-part of Ser. No. 754,884, July 18, 1968, abandoned.

[52] U.S. Cl.............. 161/6, 117/65.2, 161/159, 161/165, 161/247, 260/2.5 HA, 260/2.5 M, 264/49
[51] Int. Cl..... B29d 27/08, B32b 3/26, B32b 27/32
[58] Field of Search ............ 161/165, 159, 247, 1.6, 161/410–412, 116, 124; 260/2.5 HA, 2.5 M, 33.6 R; 264/49, 211; 117/65.2

[56] References Cited
UNITED STATES PATENTS

| | | | |
|---|---|---|---|
| 2,824,780 | 2/1958 | Satterthwaite | 264/178 |
| 3,020,597 | 2/1962 | Smith-Johannsen | 264/216 |
| 3,536,796 | 10/1970 | Rock | 264/49 |
| 3,607,601 | 9/1971 | Milam et al. | 161/165 X |
| 3,655,591 | 4/1972 | Seiner | 260/2.5 M |
| 3,660,551 | 5/1972 | Susuki et al. | 264/49 |
| 3,775,521 | 11/1973 | Yamamoto et al. | 264/211 X |
| 3,783,088 | 1/1974 | Yoshiyasu et al. | 161/165 X |
| 3,784,490 | 1/1974 | Rainer et al. | 260/2.5 HA |
| 3,816,575 | 6/1974 | Susuki et al. | 260/2.5 M |

*Primary Examiner*—Harold Ansher
*Attorney, Agent, or Firm*—George L. Church; Edward J. Hess; Anthony Potts, Jr.

[57] ABSTRACT

Disclosed is an opaque, porous polyethylene sheet. Molecular weight of the polyethylene is in excess of 500,000. The porous sheet is capable of receiving a permanent impression and the area receiving the impression becomes translucent. Method for preparing the sheet is described.

2 Claims, No Drawings

POROUS POLYETHYLENE SHEET

CROSS-REFERENCES TO RELATED APPLICATIONS

This application is a continuation-in-part of application Ser. No. 157,771, filed June 28, 1971, now abandoned which is a divisional of application Ser. No. 885,355, filed Dec. 15, 1969, now abandoned. The latter is a continuation-in-part of application Ser. No. 754,884, filed July 18, 1968, now abandoned. Copending with application Ser. No. 885,355 is application Ser. No. 884,847, filed Dec. 15, 1969; however, application Ser. No. 884,879 filed Dec. 15, 1969 was copending but is now U.S. Pat. No. 3,665,068 issued May 22, 1972.

BACKGROUND OF THE INVENTION

Generally, this invention relates to a porous polyethylene sheet having a thickness less than about 100 mils and a base weight less than about 0.17 pounds per square foot. In particular it relates to an opaque porous polyethylene sheet wherein the polyethylene has a molecular weight in excess of 500,000. The porous sheet can be used as a filter, diffusion membrane or as a mat receiving permanent impressions.

This higher molecular weight polyethylene has certain properties superior to a polyethylene with a lower molecular weight. These superior physical properties are: toughness, impact strength, abrasion resistance, antifriction, good performance at temperatures below freezing and excellent stability at temperatures as high as 300°F. But because this polyethylene is extremely viscous above its melting point, it sustains substantial shear degradation if mechanical force, for example by extrusion, calendering or injection molding, is applied to shape the molten polyethylene. Thus shaping, by extrusion, etc., this molten polyethylene causes it to lose its superior physical properties. However, the superior physical properties of this polyethylene are maintained by the porous polyethylene objects prepared by the method described herein.

J. E. Kepple, U.S. Pat. No. 3,308,073, dated Mar. 7, 1967, teaches a method of making porous objects from low molecular weight polyethylene and normally liquid hydrocarbons. In this method 92.5 parts of isoparaffinic hydrocarbon fraction with a boiling range of 420°–475°F. and 7.5 parts of polyethylene with a molecular weight of about 290,000 were heated together to above the fusion temperature of the polyethylene. The resulting viscous homogeneous liquid could be poured from the containing beaker. By comparison if 92.5 parts of isoparaffin hydrocarbon fraction with a boiling range of 420°–475°F. and 7.5 parts of polyethylene with a molecular weight of about 1,250,000, are heated together to above the fusion temperature of this polyethylene, a gel results which cannot be poured from the containing beaker. Extrusion, calendering or injection molding of this gel causes the polyethylene to undergo shear degradation and the resulting porous object loses much of its superior physical properties.

Also, M. Rock, U.S. Pat. No. 3,536,796, dated Oct. 27, 1970 teaches a method for forming a porous sheet of ethylene-butene copolymer having a standard-load melt index of 0 as mesured by ASTM D–1238–57T using Condition E (Tentative Method of Test for Measuring Flow Rates of Thermoplastics by Extrusion Plastometer). Temperature and load for Condition E are 190°C. and 2,160 grams respectively. In contrast, the polyethylene used to prepare present porous sheet has no measurable flow rate at 190°C. and under a load of 21,600 grams (Condition F, Tentative Method of Measuring Flow Rates of Thermoplastics by Extrusion Plastometer). The latter load is 10 times greater than the load used to characterize the aforementioned copolymer.

Furthermore, W. Rottig and O. Liethen's Canadian Pat. No. 692,300, issued Aug. 11, 1964 teaches a method for forming polyethylene porous articles via sintering. However, the thin, porous sheets prepared via sintering lack the substantial opacity of thin sheets prepared via the method described herein.

SUMMARY OF THE INVENTION

The present invention discloses an opaque porous polyethylene sheet having good toughness, high impact strength, excellent abrasion resistance and other superior physical properties. In addition, the porous sheet has excellent ability to receive permanent impressions and the area receiving the impression becomes translucent. The polyethylene used has a molecular weight in excess of 500,000. The sheet can be prepared by establishing a uniform heterogeneous composite of polyethylene particles and a carrier; forming the heterogeneous composite into the desired size; heating the sheet to a temperature above the melting point of the polyethylene and maintaining such temperature until the polyethylene particles have fused. The sheet is cooled, the carrier is then removed by extraction with a solvent, and thereafter the residual solvent is evaporated. The carrier can be a petroleum wax or certain liquid hydrocarbons or a synthetic wax or a mixture thereof, said carrier having specific attributes defined herein.

DESCRIPTION

Polyethylene with a molecular weight in excess of 500,000 has not been extensively used because it cannot be readily processed on conventional processing equipment, e.g., extrusion. This higher molecular weight polyethylene, when molten, has an extremely high viscosity thus requiring large quantities of mechanical work to shape the molten polyethylene. The application of so much mechanical work to this molten polyethylene literally tears the high molecular weight polymer molecule apart. This mechanical tearing apart of the polyethylene molecule has an adverse effect on the physical properties and therefore the performance of the final porous polyethylene product. This mechanical tearing apart of the polyethylene molecule occurs even when a gel of this polyethylene and a hydrocarbon such as wax is shaped by, for example, extrusion.

The shaping of the polyethylene with a molecular weight in excess of 500,000 and the subsequent making of porous sheets without the polyethylene molecule undergoing substantial shear degradation can be performed by the method described herein. This shaping can be performed by methods which otherwise cause shear degradation, for example, extrusion, calendering and injection molding. This shaping can also be performed by methods which normally would not cause shear degradation, for example, compression molding or casting.

The weight ratio of the polyethylene to carrier used in this invention can range from 5 to 50 parts by weight of polyethylene and 50 to 95 parts by weight of carrier.

A more desirable weight ratio range is from 10 to 40 parts by weight of polyethylene and 60 to 90 parts by weight of carrier.

The polyethylene used in this invention has a molecular weight in excess of 500,000. Polyethylene with a molecular weight as high as 6 million is available. Molecular weights herein referred to are determined in the following manner. The reduced viscosity of the polyethylene is determined according to ASTM D-1601-61 using tetrahydronaphthalene and a temperature of 135°C. Using the relationship between reduced specific viscosity (reduced viscosity) and molecular weight reported in "Properties and Uses of Very High-Molecular-Weight, High-Density Polyethylene," W. E. Gloor, MODERN PLASTICS, 221, p. 131–136, Nov., 1961, and the measured reduced viscosity the molecular weight of the polyethylene is determined.

The particle size of the polyethylene used can vary appreciably. For example, a satisfactory porous sheet is prepared using finely divided polyethylene particles all of which pass through a 100 mesh screen, 75% of which are retained on a 200 mesh screen and 25% of which pass through a 200 mesh screen. Equally satisfactory porous sheets are obtained when all the polyethylene particles are capable of passing through a 200 mesh screen. The screen used herein refers to U.S. Sieve Series.

The solvent used to extract the carrier from the homogeneous shaped polyethylene sheet can be any normally liquid hydrocarbon that will readily dissolve the carrier without dissolving or affecting the fused polyethylene. Preferably the solvent has a low boiling point so that it can readily be evaporated from the porous shape. Evaporation of any residual solvent from the sheet can be accelerated by heating the porous sheet to any temperature just below the fusion point of the polyethylene with or without a vacuum. Examples of suitable solvents for a carrier would be hexane, a $C_6$ paraffinic fraction boiling between 60°C. and 70°C., heptane, octane, cyclopentane and cycloheptane.

By this invention polyethylene having a molecular weight above 500,000 can be formed easily into a desired sheet by the use of a carrier without undergoing substantial molecular weight degradation. The carrier can be either solid or liquid at ambient conditions. The liquid carrier can be any liquid hydrocarbon with a molecular weight in excess of about 200, preferably a molecular weight in excess of 300. One example is a white mineral oil, another is a paraffinic lubricating fraction. A solid carrier can be either a petroleum wax or a synthetic wax. The petroleum wax used as a carrier can be obtained by any one of the processes described in Chapter 5 of THE CHEMISTRY AND TECHNOLOGY OF WAXES by A. H. Warth, 2nd Edition, and can be any one of the refined or unrefined petroleum waxes described in the same chapter. Synthetic waxes that can be used as a carrier are described in Chapter 6 of the aforementioned reference. Said carriers must have certain attributes, these are: (1) a melting point at least 20°F. lower than that of said polyethylene; (2) a viscosity at a temperature just above its melting point of not more than one-tenth of that of said polyethylene at a temperature just above its melting point; (3) substantial non-absorbability of the polyethylene by said carrier at a temperature below the melting point of the polyethylene but substantial absorbability of the polyethylene by said carrier at a temperature above the melting point of said polyethylene. The carrier can be also a mixture of two or more of the previously mentioned carriers.

The aforementioned white mineral oils are substantially free of unsaturated compounds or aromatic radicals, e.g., the phenyl or naphthyl radical. They are substantially non-volatile both at room temperature and under usual molding conditions, i.e., they boil at a temperature of 200°C. or higher at 760 millimeters of mercury absolute pressure. They ordinarily possess a viscosity lying in the range of from 10 to 70 centistokes at 100°F.

The preliminary step of making the porous sheet involves forming a heterogeneous blend of the polyethylene and carrier. For a solid carrier, such as paraffin wax, this is most conveniently accomplished by charging the carrier to a suitable mixer, e.g., a sigma blade mixer, equipped with heating means. The wax is heated to a temperature above its melting point, but below the melting point of the yet to be charged polyethylene. After the wax has softened, particles of the solid polyethylene are charged to the mixer. The mass is worked until it is completely mixed while the temperature is held at the level above specified. This heterogeneous blend can be directly fed to a shaping system. Or, a friable powder can be obtained by shutting off the heat to the mixer and maintaining the mixing. For a liquid carrier, such as white mineral oil, the heterogeneous blend can be obtained by adding the liquid carrier to a vessel equipped with a stirrer and heating devices. The temperature of the carrier can be brought up to 20°F. to 40°F. below the melting point of the yet to be charged polymer. The polyethylene is charged to the vessel and mixing continued until a well mixed composite is obtained. This heterogeneous composite can be transported to shaping equipment where it will be used at the processing conditions specified.

Air attached to the particles of polyethylene charged to the mixer and/or air entrapped during the mixing step can affect the porosity of the final product. For example, if air is in the heterogeneous composite prepared in the forementioned preliminary step the air tends to escape during the subsequent processing steps. Any air that does escape, particularly during the final heating step, affects the porosity of the resulting sheet. If desirable the preliminary step can be performed under a vacuum to remove any air attached to the finely divided polyethylene powder and/or prevent any air from being entrapped during the mixing of the polyethylene and carrier. Or, the air can be removed by the application of a vacuum just before, or during, or after the sheet is formed.

Next the composite of polyethylene and carrier is formed into a sheet. The sheet can be obtained by methods that would cause substantial shear degradation if the temperature of the composite is above the melting point of the polyethylene. Examples of such methods are extrusion, injection molding, or calendering. The desired sheet can be also obtained by methods that would not normally cause shear degradation if the temperature of the composite is above the melting point of the polyethylene. Examples of such methods are compression molding and casting. This forming is done at a temperature below the melting point of the polyethylene. If the temperature of the composite before forming were above the melting point of the polyethylene the composite would be an extremely viscous mass, barely movable even under the application of a tremendous force. However even though it would be possible to shape this molten mass under the application of appreciable force the polyethylene would undergo shear degradation and the resulting object would not have the superior physical properties of the starting high molecular weight polyethylene.

After the forming of the dispersion the temperature of the sheet is raised till it is above the melting point of the polyethylene and maintained until the polyethylene particles have fused. The length of time required to fuse the polyethylene particles depends on the dimensions of the sheet, the weight ratio of polyethylene to carrier, and the temperature difference between the heat source and the sheet. The heat can be transferred by conduction, convection or radiation or a combination thereof. The length of time at fusion temperature influences the strength of the porous sheet and its porosity. For example, when sheets are prepared with heating periods of 20 seconds the resulting tensile strengths range from 246 to 458 p.s.i.; when sheets are prepared with heating periods in excess of a 100 seconds the resulting tensile strengths are greater than 635 p.s.i.

Once the polyethylene particles fuse, the sheet is allowed to cool or is cooled to a temperature below the melting point of the polyethylene. Forced cooling can be accomplished by numerous techniques. Among these are by blowing air past the sheet or the device holding the sheet, or contacting the holding device with cold water or some other coolant. Once a temperature is reached which is below the melting point of the polyethylene the sheet usually has sufficient strength to be handled. If the carrier is a wax which is solild at ambient conditions, the sheet will have additional strength if the temperature is below the melting point of the wax.

After the sheet has sufficient strength to be handled, the carrier is removed by extraction with a solvent. This can be done by immersing the sheet in the solvent. The solvent can be at ambient temperature or at a higher temperature, but a temperature above the fusion point of the polyethylene should be avoided. The time required for extraction of the carrier depends in part on the dimension of the sheet, the weight ratio of carrier to polyethylene, and the solubility of the carrier in solvent and temperature of the solvent. The exact relationship can be determined by experimentation. With a thin sheet, a white mineral oil carrier is extracted by hexane in a few minutes. If shrinkage and/or distortion during extraction of the carrier is a problem, methods to prevent these can be used. For example, the sheet can be clamped by the edges onto an open rectangular frame and then immersed in the solvent. Other techniques are equally suitable.

The carrier-solvent mixture can be treated to separate the carrier and solvent. The separation can be by distillation or crystallization. The recovered carrier and solvent each can be recycled for reuse in the process if desired.

After the carrier has been extracted the residual solvent remaining in the sheet can evaporate or be removed by vacuum with or without heat. The time required for this evaporation depends in part on the dimension of the porous sheet, the porosity, the vapor pressure of the solvent and temperature; the relationship can readily be determined by experimentation.

Following are examples of this invention along with comparative runs, using other polymers, but which resulted in unsatisfactory sheets:

EXAMPLE I

In this first example 50 percent by weight of a polyethylene and 50 percent by weight of a white mineral oil were compounded into a thick paste. This paste was spread between glass plates and heated in an oven to a temperature just above the melting point of the polymer. Fusion rapidly occurred and upon cooling a strong self-sustaining sheet was obtained. The oil in the sheet was washed out with normal hexane and residual hexane was evaporated, leaving a porous opaque stiff membrane. This membrane, when typed upon with a typewriter without a ribbon, takes a permanent image. The pressure causes the micro voids to collapse thereby resulting in a negative image composed of sharp translucent lines on an opaque background.

Typical properties of the polyethylene powder used in the aforementioned Example I were:

| | |
|---|---|
| Specific Gravity | 0.940–0.942 |
| Melt Index (ASTM D1238) | nil |
| Crystalline Melting Point | 266–268°F. |
| Molecular Weight | 1,250,000 |

A particle size analysis showed that the whole powder passed through 100 mesh with 75% retained on 200 mesh while 25% passed through 200 mesh.

The white mineral oil used herein had a specific gravity between 0.88 and 0.90 and SUS viscosity at 100°F. between 360 and 390.

EXAMPLES II – XIV

Additional opaque porous polyethylene sheets were prepared in the following manner. The polyethylene powder described in Example I was dispersed in the aforementioned mineral oil by stirring. The dispersion was moderately stable to gravity separation over a time span of several hours. If separation occurred the powder was easily redispersed by stirring the composite. A typical dispersion consisted of one part by weight of the polyethylene fraction and three parts by weight of mineral oil. The Brookfield viscosity of this composition was about 5,000 cps compared to about 155 cps for the mineral oil without the added powder. A typical antioxidant was used at 0.02–0.05 part per total weight of dispersion. The dispersion was vacuum degassed to remove any air within the dispersion.

The dispersion was doctored onto a flat metal surface at the desired thickness using a Gardner knife. A piece of 8 × 9 × ⅛ inch stainless steel plate was used. This steel plate was placed on a hot plate and the latter's temperature was raised to 350°–400°F. or was already at the elevated temperature. This temperature was maintained until the dispersed polyethylene fused.

Fusion was monitored by the sharp change in reflectivity of the surface of the sheet. This change in reflectivity from glossy to dull is believed to be due to the melting of the particles of the polyethylene. The total heating time varied from 20 seconds to 160 seconds.

The sheet was quenched by running cold tap water against the back side of the stainless steel plate immediately after the entire sheet surface fused. This required at most several seconds. Once cooled the sheet was in a gel-like condition but possessed sufficient strength to be handled.

This sheet was then clamped by the edges onto an open rectangular frame to prevent shrinkage and distortion. It was then immersed in hexane at room temperature and removal of the mineral oil occurred rapidly. Immersion times as short as 2–3 minutes were sufficient to remove the oil. The resulting porous sheet was allowed to dry while clamped within the frame.

The sheet was somewhat limp, compared to a paperboard of comparable thickness. It was extremely white and opaque. The surface of the sheet that had been in contact with the steel plate during the fusion step was relatively smooth and somewhat glossy though white. The upper side had a satin-like appearance and was extremely bright.

Porous sheets of various thicknesses were tested for tensile strength, with results as reported in the accompanying Table I.

Table I

Tensile Strength of Porous Ethylene Sheets

| Run | Gauge:Mils (at Point of Rupture) | Heating Time:Seconds (after onset of fusion was observed) | Tensile Strength: p.s.i. | Elongation % |
|---|---|---|---|---|
| 2 | 3.2 | 20 | 250 | 25 |
| 3 | 6.0 | do. | 458 | 98 |
| 4 | 9.7 | do. | 330 | 26 |
| 5 | 9.1 | do. | 362 | 29 |
| 6 | 15.9 | do. | 310 | 200 |
| 7 | 24.2 | do. | 347 | 51 |
| 8 | 27.6 | do. | 246 | 27 |
| 9 | 7.5 | 140 | 676 | 510 |
| 10 | 11.3 | 160 | 660 | 392 |
| 11 | 11.4 | 125 | 635 | 268 |
| 12 | 18.0* | 140 | >835 | 646 |
| 13 | 26.1* | 145 | >808 | 943 |
| 14 | 27.2 | 135 | 773 | 1141 |

* No rupture occurred; gauge determined in area between machine grips.

Apparently over the range examined the thickness of the sheet does not affect tensile strength but heating time after the onset of fusion does.

EXAMPLES XV – XXIV

A series of runs was made to determine base weight-thickness relationship for other sheets prepared by substantially the same method as described for Examples II – XIV. This information is presented in accompanying Table II.

Table II

Weights of Sheets of Different Thickness and Porosity

| Run | Sheet Thickness, mils | Base Weight, lb. 3000 sq. ft. |
|---|---|---|
| 15 | 3.8 | 12.5 |
| 16 | 7.7 | 37.0 |
| 17 | 9.2 | 43.9 |
| 18 | 9.3 | 48.3 |
| 19 | 10.0 | 48.3 |
| 20 | 10.0 | 50.1 |
| 21 | 14.0 | 50.8 |
| 22 | 14.0 | 71.9 |
| 23 | 16.0 | 58.3 |
| 24 | 20.0 | 92.8 |

Comparison of sheet thickness and base weight of various sheets reported in Table II indicate the differences in porosity that were obtained by these runs. Thus for example the sheets made during Runs 21 and 22 had the same 14 mils thickness yet one sheet had a base weight of 50.8 lbs. per 3,000 sq. ft. compared to the other sheet with a base weight of 71.9 lbs. per 3,000 sq. ft.

Substantially equivalent results, as in the aforementioned examples of this invention are obtained when (1) other carriers are used and/or (2) other polyethylenes with molecular weights in excess of 500,000 are used and/or (3) said polyethylenes have particle sizes substantially different from those used.

Comparative Examples

Several attempts to prepare similar sheets from other polymers using the heretoforementioned technique were made without notable success. A medium impact polystyrene powder was treated but significant particle fusion could only be realized on prolonged heating (e.g., 5 minutes). Furthermore the resulting sheet was fragile, while oil removal produced an equally fragile sheet. A polyethylene with a molecular weight of about 300,000 was also treated. This lower molecular weight polyethylene has a substantial flow under Condition F of ASTM D–1236–62T. After fusion and cooling steps the resulting sheet was butter-like in consistency and could not be handled satisfactorily. Extraction of the mineral oil produced a crumbly solid with no strength. A polypropylene with a molecular weight of about 300,000 was also treated. However the sheet produced after quenching was too soft and after slow cooling too waxy for further handling.

The invention claimed is:
1. An opaque porous sheet
consisting essentially of polyethylene having a molecular weight in excess of 500,000;
having a thickness less than about 100 mils;
said sheet when pressed receiving a permanent impression and the area receiving the impression becomes translucent.
2. Sheet according to claim 1 wherein the base weight of the sheet is less than about 0.17 pounds per square foot.

* * * * *